April 22, 1969 — A. G. BOLDRIDGE, JR — 3,439,544
CESIUM ION ACCELEROMETER
Filed May 28, 1965 — Sheet 1 of 2

INVENTOR.
AUSTIN G. BOLDRIDGE, JR
BY Albert H. Kronman
ATTORNEY

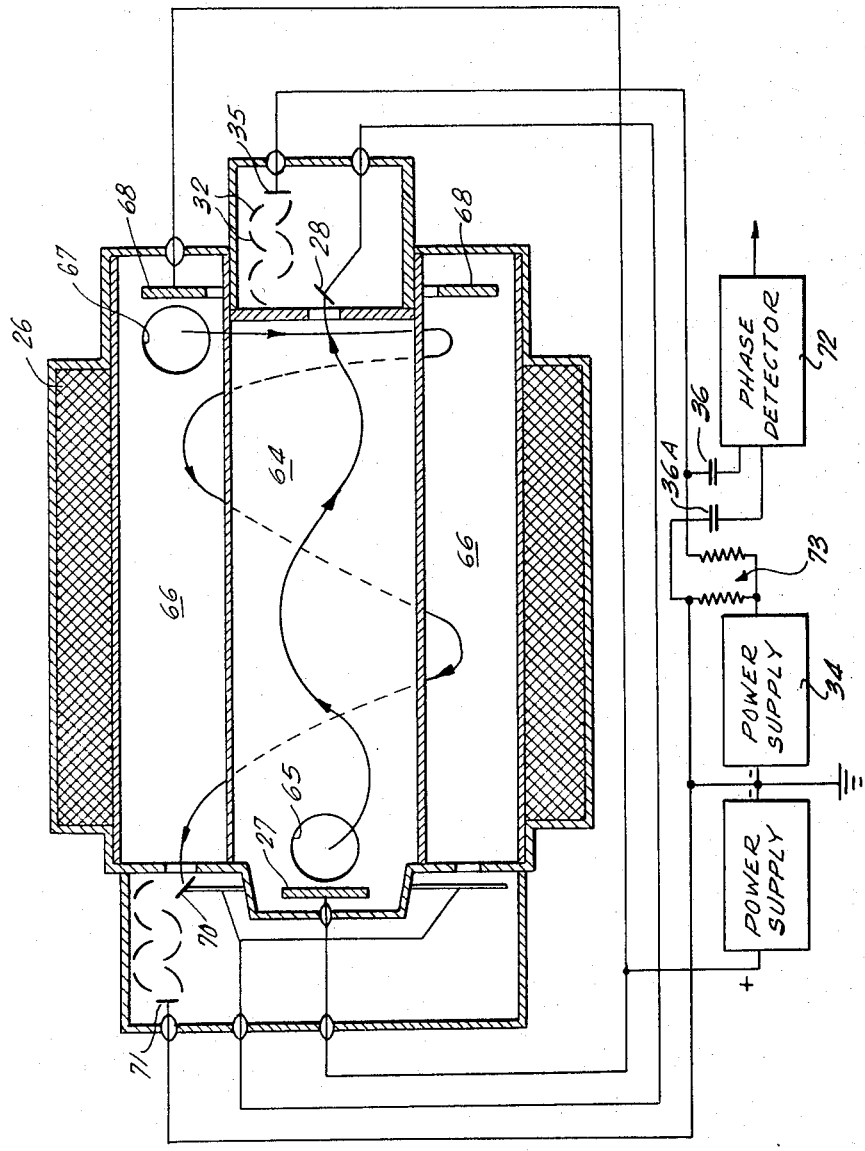

United States Patent Office 3,439,544
Patented Apr. 22, 1969

3,439,544
CESIUM ION ACCELEROMETER
Austin Gallatin Boldridge, Jr., 444 Eastgate Road,
Ridgewood, N.J. 07450
Filed May 28, 1965, Ser. No. 459,862
Int. Cl. G01p *15/08*
U.S. Cl. 73—517                                               1 Claim

ABSTRACT OF THE DISCLOSURE

An acceleration measuring device for moving vehicles in which an ion drift tube determines the acceleration along a predetermined line of motion. A helical beam of ionized cesium atoms is first modulated by a standardized frequency generator. The ion beam is then collected by an electrode and the resultant frequency is compared with the generator frequency. A magnetic filtering means separates the ions from generated electrons prior to the beam modulation.

---

This invention relates to an accelerometer for determining the acceleration of a moving vehicle along a predetermined line of motion. It has particular reference to an accelerometer using the inertia of a modulated helical beam of ionized cesium atoms to determine the amount of acceleration. The frequency generated by the ion beam is compared with the frequency of a generator which modulates the ion beam.

Many types of accelerometers have been designed and built for determining the acceleration of moving bodies. Some of these instruments are used with inertial guidance systems for determining the acceleration, the velocity, and the distance traveled by a vehicle. Many of the mechanical arrangements for determining acceleration are quite complex and costly and are subject to breakdown because of lubrication problems. All the mechanical systems have the disadvantage of introducing considerable time lag into the system because they operate slowly and take a considerable time before an accurate reading is available. The accelerometers described herein are small, fast acting, and give results that are practically instantaneous.

An object of the present invention is to provide an improved accelerometer which avoids one or more of the disadvantages and limitations of prior art arrangements.

Another object of the present invention is to obtain a measurement of acceleration which is practically instantaneous.

A further object of the present invention is to provide an accelerometer which is small in size, low in weight, and which is practically independent of large overloads.

The invention includes an accelerometer comprising a source of ions emitted from an ion emissive electrode. The beam is filtered by at least two permanent magnet fields so that the ion velocities are confined within a restricted range of values. A modulating cavity is placed in the path of the ion stream so that the ions are bunched and proceed in discrete pulses. The pulsed stream of ions is next directed into one end of a drift tube set at right angles to the stream direction.

A linear electric field and an axial magnetic field are applied to the ions as they enter the drift tube so that they move along the tube in a helical path. After traversing the drift tube, the ions strike an electron emissive cathode and produce electrons having the same frequency as the ion bunches which strike the cathode. An electron multiplier device is associated with the emissive cathode so that the pulse amplitudes may be amplified, and produce an electrical output having a measurable frequency.

A feature of the present invention includes a self-controlled high frequency electronic clock which provides a stabilized frequency. This clock arrangement includes a standard oscillator and a frequency multiplier with stabilizing means.

Other features of the present invention include a phase detector, a cycle counter, and an integrator which produce the desired values of acceleration, velocity, and distance.

The invention consists of the construction, combination and arrangement of parts, as herein illustrated, described and claimed.

In the accompanying drawings, forming a part hereof, there are illustrated two forms of embodiment of the invention, in which drawings similar reference characters designate corresponding parts, and in which:

FIGURE 5 is a cross sectional view of a drift tube combination using two helical ion beams moving in opposite directions.

Figure 1:
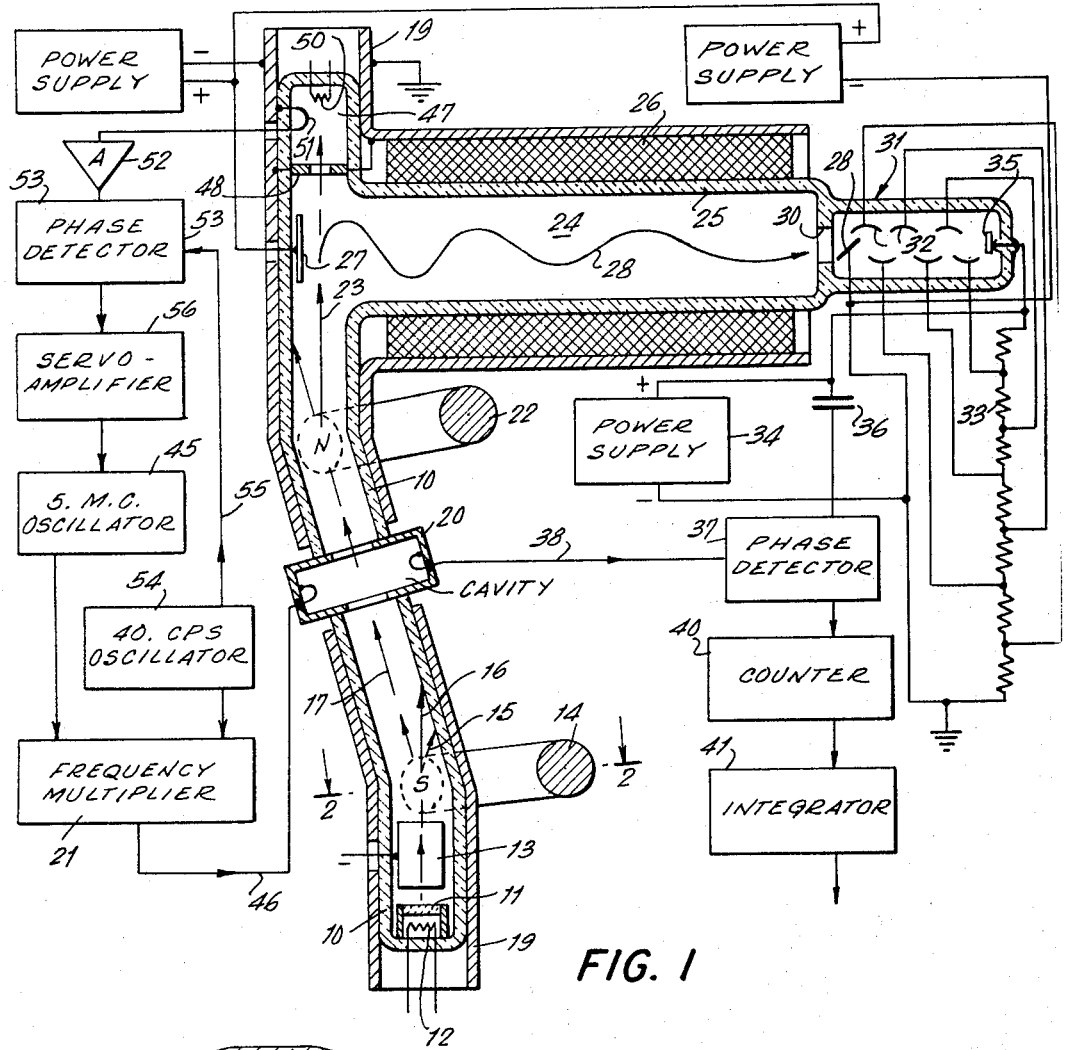
FIGURE 1 is a cross sectional view of the accelerometer drift tube and ion generator with some of the electronic components shown in block form.
Figure 2:
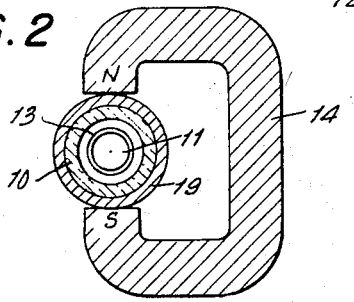
FIGURE 2 is a cross sectional view of one of the magnets shown in FIGURE 1 and is taken along line 2—2 of that figure.

Referring now to the drawings, the accelerometer shown in FIGURE 1 includes an ion tube 10, of glass or quartz having an ion emissive disc of cesium 11 at one end. The cesium disc 11 is heated by a resistance heater 12 so that ionized cesium atoms are boiled off the surface of the disc. Adjoining the disc 11 is an ion focusing means 13 which is similar to the electron focusing means employed in television picture tubes but in this case the potentials are reversed since positive ions are to be collected in a beam and directed along the length of the tube 10. It has been found by experiment that an elaborate focusing means is not necessary and may be omitted but an accelerating potential must be provided. The tube 10 is protected from stray electric fields by a conductive shield 19.

The beam of ions which emerges from the focusing means 13 includes ions having a wide range of velocities and also includes some electrons. In order to filter this beam, a first permanent magnet 14 is placed adjacent to the tube so that the flux generated by the magnet passes through the ion beam in a direction which is perpendicular to the plane of the drawing shown in FIGURE 1. This magnetic field turns the electrons to the right in a direction indicated by the arrow 15. Most of the neutral atoms are unaffected by the magnetic field and proceed in a direction indicated by arrow 16, striking the side of the tube. The ionized atoms are deflected to the left in a direction indicated by arrow 17, and proceed along the axis of the tube through a resonant cavity 20. Any type of high Q resonant cavity may be used and its purpose is to modulate the ion beam at the 6S–CP transition frequency of $C_s$, and produce a plurality of ion bunches or pulses at the end of the tube. The cavity 20 is supplied with a high frequency power wave by means of a frequency multiplier 21 which will be described later. After leaving the cavity the ion stream is next directed through a second magnetic field produced by a second permanent magnet 22. This magnetic field further restricts the range of velocities of the ions and bends the high velocity ions to the right so that they proceed along a path indicated by arrow 23.

The modulated ion beam now enters one end of a drift tube 24 set at approximately right angles to the direction of ion tube 10. The drift tube 24 is enclosed by an insulating envelope 25 and is surrounded by a solenoid winding 26 which generates an axial magnetic flux. An electric field is also applied to drift tube 24 by means of an anode 27 and an electron emitting cathode 28 which may be grounded. The combination of these two fields acts on the pulsed ion stream and sends the stream along the drift tube in a helix, the amplitude of which diminishes as indicated by arrow 28. At the other end of the tube an opening 30 is provided for a portion of the ions which emerge from the drift tube 24 and strike the inclined cathode 28, thereby emitting a number of electrons, also in pulses.

There are a large number of neutral cesium atoms in the ion tube and the drift tube creating a gas plasma. In a plasma, consisting of neutral atoms and ions, only the ions are forced to move in a helical path as indicated. Because of many collisions of the ions with neutral atoms the ion beam tends to become broader. However, as the beam is accelerated under the influence of the electric field, the ions have greater energy and collisions with neutral atoms, produce a greater number of ionized atoms, thereby increasing the beam current to effective beam thickness ratio.

Because of the collision in the plasma, a large number of electrons are liberated. Since their mass is so much smaller than the cesium atoms, the electrons will move to the left toward the anode 27 in a small helical path reducing the probability of collision with the ions in their movement.

An electron multiplier arrangement 31 is associated with the cathode 28, this tube including a plurality of dynodes 32 which are connected in the usual manner to a voltage divider 33, and to a power supply 34 for attracting the secondary electrons sequentially and finally delivering them to an anode 35. The electron multiplier may be constructed as shown in FIGURE 1 or it may consist of dynodes arranged in a circular form or a plurality of dynodes containing louvers arranged along the axis of the tube. The anode 35 is connected in series with a capacitor 36 to a phase detector circuit 37 for the final measurement of frequency change.

Phase detector circuit 37 is also connected to the cavity 20 by conductor 38 and the phase between the cavity frequency and the frequency produced by the drift tube is measured by the detector circuit in the usual manner and applied to a counter circuit 40. The counter circuit is necessary because values of high acceleration may produce a phase change of more than 360 degrees. The counter circuit 40 is designed to count the total cycle phase change and any fractional change that may occur, and pass this information to a first integrator circuit 41. The helical beam 28 is composed of a plasma of neutral cesium atoms and singly ionized cesium ions which are accelerated down the horizontal axis of the drift tube by an electric field of about 200 volts although this value may be varied considerably to suit the acceleration values to be measured. The drift tube 24 is mounted in axial alignment with the direction of the acceleration to be measured and if the tube is moved to the right or left as shown in FIGURE 1, more or less bunches of ions will strike the emissive cathode 28 in any selected time interval. Such an action increases or decreases the frequency which is transmitted by anode 35 and applied to the phase detector 37. The difference in frequency is proportional to the first derivative of the acceleration.

If a high frequency oscillator of about 10 kilomegacycles were applied to cavity 20, the device as described above can be relied upon to give a fairly accurate result. However, all oscillators producing such high frequencies are liable to drift in frequency value and it is highly desirable to produce a high frequency which is stabilized. Such a result can be produced by the circuits shown to the left of the ion tube 10. A five megacycle tunable oscillator 45 is the low frequency source of the clock system. This may be any type of tunable oscillator whose frequency is determined and/or controlled by variable inductance, capacity, current or voltage. The output of this oscillator is applied to the frequency multiplier circuit 21 which may be an array of nonlinear diodes and a multiport cavity filtering system. The diodes produce a large variety of high frequency components and the filtering system selects only those harmonics which are desired. These are applied to the cavity 20 over conductor 46. However, neither the five megacycle oscillator nor the frequency multiplier has sufficient stability to produce a stabilized frequency and other means must be provided to maintain the frequency within a restricted range of values. This control is accomplished by the use of a first sensing chamber 47 which is positioned near the anode end of the drift tube 24. There will be enough stray ions, having a fast speed, to enter a diaphragm 48 and move into cavity 47. This cavity contains an emissive heater 50 and an anode loop 51. The anode loop is connected to an amplifier 52 and to a phase detector circuit 53.

The frequency multiplier circuit 21 is also coupled to a 40 cycle oscillator 54 which is connected so that it partially modulates the high frequency sent to cavity 20. Oscillator 54 is also connected by means of conductor 55 to the phase detector 53 and any variation between the oscillator 54 and the output of amplifier 52 is measured and applied to a servo-amplifier 56. The servo-amplifier may contain the usual servo-motor arrangement which can be coupled to the oscillator 45 to change its frequency. However, it has been found more efficient to connect the output of amplifier 56 to a thermistor or other non-linear device in the oscillator circuit.

The arrangement of circuits described above is old in the art and is generally termed a cesium clock. If the frequency transmitted over conductor 46 should vary by a few cycles, this variation is transferred to the ion stream and is sensed by cavity 47. The phase detector 53 picks up this variation and passes it to the servo-amplifier 56 which alters output frequency of the five megacycle oscillator by a small amount to stabilize the multiplier frequency applied to cavity 20.

Figure 4:
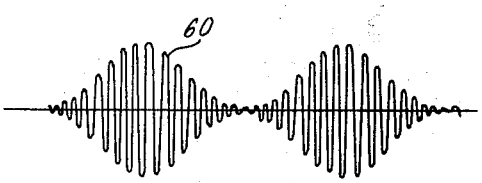
FIGURE 4 is another graph showing the wave form of the electric signal which is produced by the frequency multiplier shown in FIGURE 1.

FIGURE 4 shows a high frequency wave 60 modulated by a 40 cycle wave. This wave is transmitted over conductor 46 to cavity 20.

Figure 3:
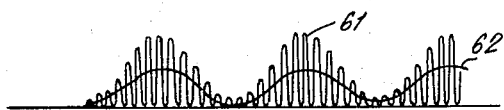
FIGURE 3 is a graph showing the wave form produced by the output phase detector shown in FIGURE 1.

FIGURE 3 shows a wave 61 which is applied to the phase detector 37 and results from the combination of a cavity reference frequency transferred over conductor 38, and the altered frequency generated at anode 35. The combination of these two waves is rectified by a unilateral component, such as a silicon diode, and a difference frequency wave component 62 is produced. The frequency of this wave is proportional to the change in acceleration of the drift tube.

It is evident that a vehicle containing the accelerometer and given a constant acceleration will result in an ion stream of modified helical path but, if the acceleration is constant, the same number of ion groups per unit of time will be collected by the cathode 28 as entered the drift from the ion tube 10. For this reason an integrator must be employed to record the frequency changes as the acceleration is changed. The integrator may be a digital counter using multivibrator circuits or any other type of electronic counting means which is well known in the art. The output of this circuit is applied to an indicator means which may be a current meter or a recording instrument. It is obvious that the information supplied to the frequency meter may also be applied to a second integrator circuit for the determination of velocity and to a third integrator circuit for the determination of distance. This latter arrangement of circuits being common to all accelerometer systems.

The drift tube combination shown in FIGURE 5 contains two coaxial tubes, each with a helical ion beam. The central drift tube 64 is the same as drift tube 24 shown in FIGURE 1. Ions are injected into the drift tube 65 which is disposed perpendicular to the plane of the paper. A magnetic winding 26 produces an axial magnetic field as described in connection with FIGURE 1 and electrodes 27, 28, produce an electric field as before to direct the ion stream in a helical path. Dynodes 32 multiply the electrons produced by cathode 28 and send them to anode 35 to produce an alternating current which varies in frequency as the acceleration is changed. The voltage and current supplies for this alternate arrangement are not shown in FIGURE 5. They are the same as shown in FIGURE 1.

Severe temperature changes may change the length of the drift tube 64 and produce a false acceleration indication. Also, a change in current through winding 26 may vary the path direction. The voltage applied to electrodes 27, 28, must be kept within a very small range of values to produce an accurate measurement. All the variations may be cancelled by providing a second drift tube 66, annular in shape, surrounding drift tube 64 and sending a helical ion beam in the opposite direction. A second ion tube 67 injects an ion beam into the annular space and the same magnetic field and electric field act on the beam to send it into a helical path around the control drift tube 64. In this case electrode 68 is connected to electrode 27 and electrode 28 is connected to electrode 70. This arrangement insures that the electric field is the same in both drift tubes and any variation in voltage will be applied to both fields equally. Also, the potentials applied to the dynodes and anodes 35 and 71 are the same. However, it is obvious that, for any acceleration of the drift tubes, the frequency is increased on one anode and decreased in equal amount on the other anode. For this reason, a double phase detector 72 is used, the power is supplied through an isolating impedance network 73, and two blocking capacitors 36 and 36A are connected in series with each of the anode conductors.

Both accelerometer provide instant indications of acceleration, velocity, and distance. All action of the acceleration measuring means is dependent entirely on the inertia of a stream of pulsed ions and there are no mechanical moving parts.

While the present disclosure has been directed to the case of cesium ion, it will be apparent that other hydrogen-like elements such as hydrogen lithium, sodium, potassium and rubidium, may be used without departing from the spirit of the invention.

Having thus fully described the invention, what is claimed as new and desired to be secured by Letters Patent of the United States, is:

1. An accelerometer comprising, a drift tube for enclosing a stream of ions, an ion tube connected to the drift tube at one end thereof and disposed substantially at right angles thereto, an ion generator positioned at one end of the ion tube for generating a beam of ions of a predetermined material, velocity modulating means connected to the ion tube for separating the ion stream into discrete groups, a magnet adjacent the ion tube to produce a magnetic flux disposed at right angles to the direction of the ion stream for filtering the stream, separating the electrons and neutral atoms from the stream and for restricting the ions in the beam to a predetermined range of velocities, electrodes mounted at either end of the drift tube for creating an electric field therebetween and for moving the ion groups along the length of the tube, sensing means for collecting the ion groups after they have traversed the drift tube and for transforming the groups itno an alternating current, high frequency generating means for applying high frequency power to said velocity modulation means to control the modulation frequency, a source of current power connected to said electrodes in the drift tube, a winding surrounding the drift tube for generating a magnetic field in axial alignment with the axis of the drift tube for driving the ion groups into a helical path, and circuit means for applying the alternating current received from one of said electrodes to a utilization circuit.

References Cited

UNITED STATES PATENTS

| 3,090,240 | 5/1963 | Nashman et al. | 73—517 |
| 3,106,678 | 10/1963 | Lynn | 73—517 XR |
| 3,114,268 | 12/1963 | Boldridge | 73—517 |

JAMES J. GILL, *Primary Examiner.*